United States Patent
Stöcklein

(10) Patent No.: US 9,122,035 B2
(45) Date of Patent: Sep. 1, 2015

(54) DYNAMIC CATERPULLER SYSTEM AND METHOD FOR MANUFACTURING BUFFER TUBES FOR FIBER OPTIC CABLES

(71) Applicant: CCS Technology, Inc., Wilmington, DE (US)

(72) Inventor: Waldemar Stöcklein, Coburg (DE)

(73) Assignee: CCS TECHNOLOGY, INC., Wilmington, DE (US)

( * ) Notice: Subject to any disclaimer, the term of this patent is extended or adjusted under 35 U.S.C. 154(b) by 0 days.

(21) Appl. No.: 13/790,407

(22) Filed: Mar. 8, 2013

(65) Prior Publication Data

US 2014/0133813 A1    May 15, 2014

Related U.S. Application Data

(60) Provisional application No. 61/725,752, filed on Nov. 13, 2012.

(51) Int. Cl.
*G02B 6/44* (2006.01)
*B29C 47/88* (2006.01)

(52) U.S. Cl.
CPC .............. *G02B 6/4479* (2013.01); *B29C 47/88* (2013.01); *G02B 6/44* (2013.01); *G02B 6/4485* (2013.01); *G02B 6/4401* (2013.01); *Y10T 29/49829* (2015.01)

(58) Field of Classification Search
CPC .. G02B 6/4485; G02B 6/4479; G02B 6/4401; G02B 6/44; B29C 47/88; Y10T 29/49829
USPC ........ 29/819, 419.1, 742, 759, 761, 783, 787, 29/788, 791, 795, 796, 820; 425/113, 404; 226/7, 97.1; 254/134.3 R
See application file for complete search history.

(56) References Cited

U.S. PATENT DOCUMENTS

| | | | | |
|---|---|---|---|---|
| 4,354,992 A * | 10/1982 | Bahder | ............................ | 264/85 |
| 5,372,757 A * | 12/1994 | Schneider | ..................... | 264/1.28 |
| 8,489,219 B1 * | 7/2013 | Strong et al. | .................. | 700/105 |
| 2009/0297102 A1 * | 12/2009 | Kachmar | ......................... | 385/87 |

* cited by examiner

Primary Examiner — Ryan J Walters
(74) Attorney, Agent, or Firm — William D. Doyle

(57) ABSTRACT

A manufacturing line includes an extruder and a dynamic caterpuller system located after the extruder along the manufacturing line. During manufacturing, a fiber optic assembly is produced, where the fiber optic assembly includes a tube containing at least on optical fiber. The tube is extruded via the extruder and loaded via the dynamic caterpuller, which includes a closed pipe through which passes a liquid and the fiber optic assembly. The flow rate of the liquid is different than the speed of the fiber optic assembly through the pipe such that drag is imparted on the fiber optic assembly by the liquid.

4 Claims, 2 Drawing Sheets

DYNAMIC CATERPULLER SYSTEM AND METHOD FOR MANUFACTURING BUFFER TUBES FOR FIBER OPTIC CABLES

RELATED APPLICATIONS

This application claims the benefit of priority under 35 U.S.C. §119 of U.S. Provisional Application Ser. No. 61/725,752 filed on Nov. 13, 2012, the content of which is relied upon and incorporated herein by reference in its entirety.

BACKGROUND

Aspects of the present disclosure relate generally to a dynamic caterpuller system for applying loads to a buffer tube of a fiber optic cable during manufacturing of the same.

Buffer tubes may be manufactured by extrusion processes. The fiber optic elements (e.g., glass optical fibers with glass core(s) in polymer-coated glass cladding) are typically protected by a polymer tube that is extruded around the elements. Typically up to twelve fibers may be inserted into a single buffer tube, which may have dimensions of about 2.5 millimeters (mm) in diameter. Normally buffer tubes are stranded around a central element, such as a rod of glass reinforced plastic (GRP). This resulting assembly is then covered with a polymer sheath or jacket (e.g., polyethylene jacket) to protect the cable against environmental elements.

To improve mechanical performance of the resulting cable, excess fiber length (EFL) has to be very carefully controlled, where the EFL is the relative length difference between the length of the fiber optic elements and the buffer tube. A typical value of the EFL is on the order of about 0.05% of stranded tubes and up to about 0.5% for central-tube cable designs, where the buffer tube is put in the center of the cable and strength elements may be arranged around the buffer tube. In either case, control of the EFL during manufacturing may be important to the stress and strain performance of the resulting cable.

State-of-the-art buffer tube manufacturing equipment 10 typically includes the following components (see FIG. 1): a fiber pay-off 12, an extruder 14, a clinching caterpuller 16 (also called "caterpillar"), a wheel capstan 18, and a tube take-up 20. The fiber optic elements, covered with a high-viscous gel are inserted into the extruder 14, where the gel applicator may be located before the extruder 14 in a manufacturing line. The polymeric tube is then extruded around the fibers. After the extruder, the buffer tube is typically cooled down in a water trough, passed through the clinching caterpuller 16, and guided around a wheel capstan 18. The buffer tube is guided between belts of the clinching caterpuller 16, which are moderately pressed to the buffer tube to reduce slippage therebetween.

By adjusting the speed difference between the wheel capstan 18 and the clinching caterpuller 16, the tube is tensioned or compressed longitudinally. As a result, EFL can be adjusted in a wide range. This manufacturing process relies upon a close contact between the surface of the buffer tube and belts of the caterpuller 16. As a result the buffer tubes may get deformed when the forces of the belts are too high and when the tube is still too soft (molten; not completely cooled down following extrusion). Such an effect becomes even more salient when the tube diameter is below 2.5 mm. Aspects of the present disclosure seek to overcome such problems.

SUMMARY

One embodiment relates to a manufacturing method that includes applying a high-speed water stream parallel to the buffer tube, between the wheel capstan and the extruder such that an accelerating force may be generated, which can also be used to adjust EFL of optical fibers in the buffer tube without deforming the buffer tube. Further, the water may be used to cool the buffer tube, and may be temperature controlled to facilitate a desired rate of cooling.

Another embodiment relates to a device, which could be used as a replacement for a clinching caterpuller. The device operates contact free (i.e. without a solid-to-solid contact interface) and thus does not exert uneven forces on the buffer tube. Put another way, no deformation of the buffer tube occurs. The acceleration of the tube is achieved by a high-speed water stream along the buffer tube that influences the tube via friction between the surface of the tube and the water of the water stream. Friction between the water and the buffer tube surface may be adjusted by changing the speed of the water flow. Additionally, changing the flow direction may be used to control between applying a tension or compression of the buffer tube.

Another embodiment relates to a fiber optic assembly, which includes a plurality of optical fibers and a buffer tube. The buffer tube is formed from a polymeric extrudate surrounding the plurality of optical fibers, which are loosely contained by the buffer tube such that the plurality of optical fibers have an excess fiber length (EFL) relative to the length of the buffer tube. The buffer tube is particularly narrow, having an outer diameter of less than 2 mm with a wall thickness of at least 0.3 mm. Furthermore, the buffer tube is particularly round in cross-section, having an average ovality of 10% or less along a 10 meter length of the buffer tube.

Advantages of the present technology result from the fact that no direct mechanical unidirectional contact is necessary to load the buffer tube (i.e., "contact free"). Thus the tube is not deformed. Further, this device and process can be used for small-diameter buffer tubes (less than 2.5 mm), where current methods fail to prevent deformation due to softness of the tube when the wall. Even though a relatively high flow rate of water may be required to achieve sufficient loading of the buffer tubes, the amount of water may be limited to a closed system, and may accordingly be reused (i.e., the water may be continuously pumped in a loop).

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present innovations and inventions are not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 4:
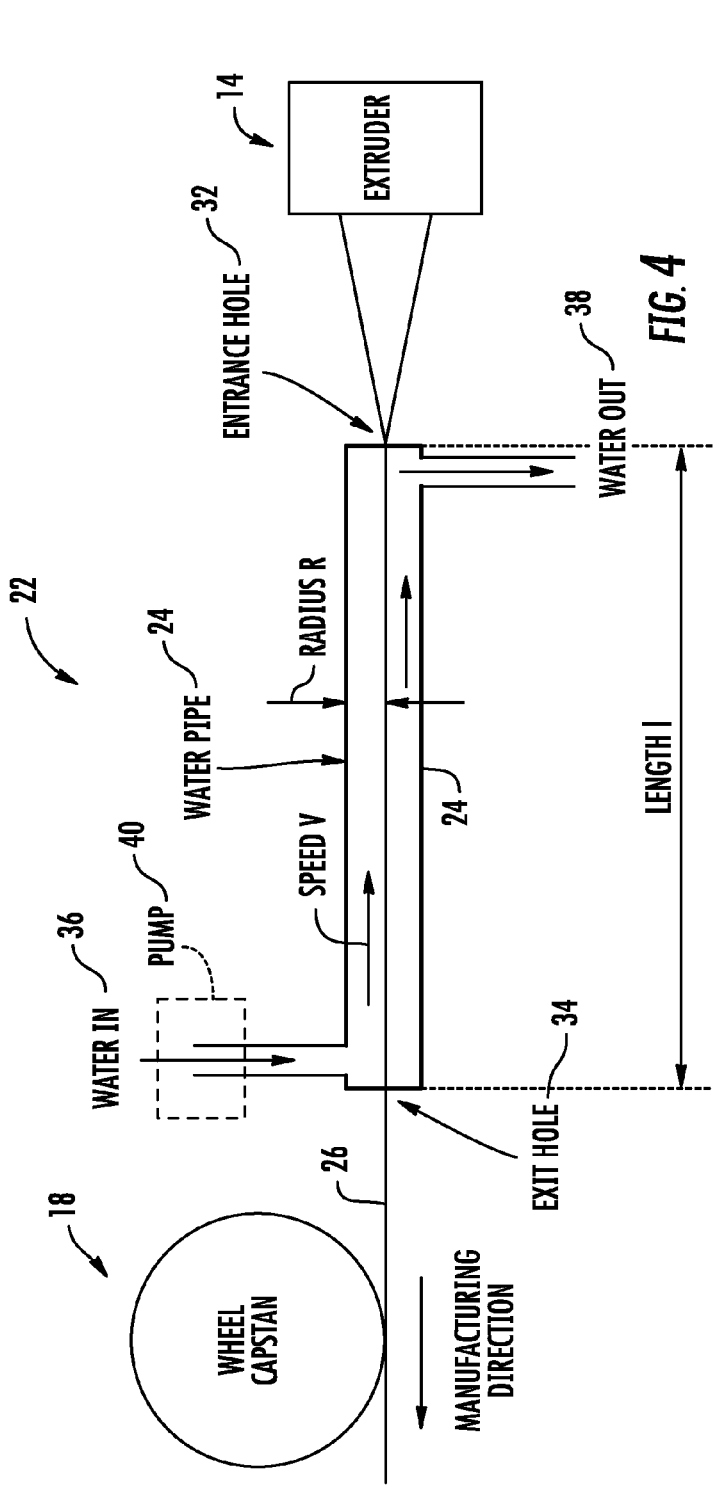
FIG. 4 is a schematic diagram of a dynamic caterpuller system including a water pipe according to an exemplary embodiment.

Referring to FIG. 4, a manufacturing line 10 includes dynamic caterpuller system 22, which includes a stable water pipe 24 (e.g., closed conduit, passageway) with a length (l). In some embodiments the pipe 24 is round in cross-section and has a radius R. Otherwise shaped pipes are contemplated (e.g., rectangular). According to an exemplary embodiment, the dynamic caterpuller system 22 is located between an extruder 14 and a wheel capstan 18 (or the functional equivalent) in the manufacturing line 10. Water is pumped through the pipe 24 at a pressure sufficient to move the water through the pipe 24 at a desired velocity profile to obtain a desired loading (e.g., frictional interaction) of the extruded element, such as a buffer tube.

Figure 1:
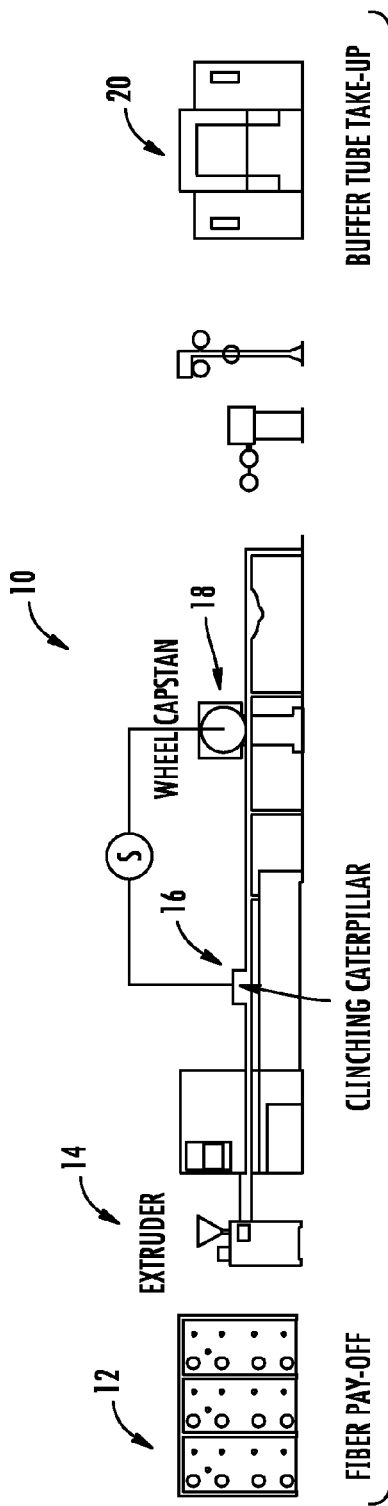
FIG. 1 is a schematic diagram of a line for manufacturing buffer tubes of fiber optic cables.
Figure 3:
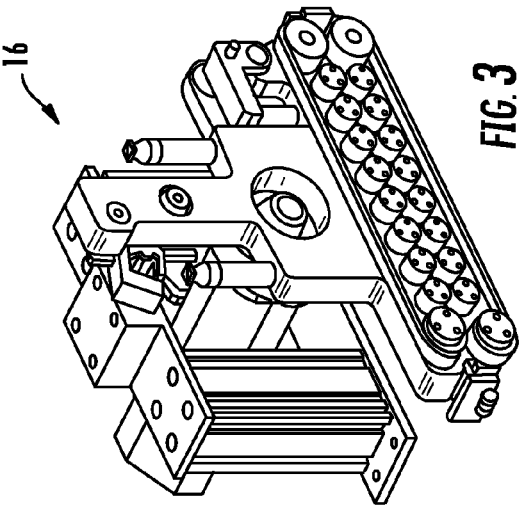
FIG. 3 is perspective view of a clinching caterpuller.
Figure 2:
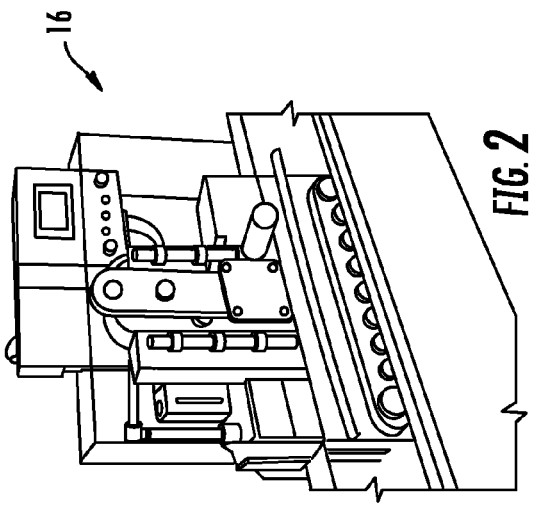
FIG. 2 is a perspective view of a clinching caterpuller.

The dynamic caterpuller system 22 of FIG. 4 may replace a conventional clinching caterpuller 16, as shown in FIGS. 2-3, on the manufacturing line 10. More specifically, the belts of the clinching caterpuller 16 that grip and load the buffer tube may be replaced by a flowing stream of water (or other fluid, e.g., alcohol) that introduces frictional forces (either positive or negative) to the extruded elements.

As shown in FIG. 4, a manufacturing line 10 includes an extruder 14 and a dynamic caterpuller system 22 located after the extruder 14 along the manufacturing line 10. Intermediate components may be located therebetween. In some embodiments, manufacturing line 10 further includes a capstan 18, where the dynamic caterpuller 22 is located between the extruder 14 and the capstan 18 along the manufacturing line 10.

During manufacturing, a fiber optic assembly is produced, where the fiber optic assembly 26 comprises a tube containing at least on optical fiber. In some embodiments, the fiber optic assembly 26 is a buffer tube 28, as may be positioned in a loose-tube cable or central-tube cable. In other embodiments, the fiber optic assembly may be a drop cable (see, e.g., cables disclosed in U.S. Publication No. 2011/0229098).

According to an exemplary embodiment, the tube 28 (see FIG. 5) is extruded via the extruder and loaded, either in tension or compression, via the dynamic caterpuller 22. More specifically, the dynamic caterpuller 22 includes a closed pipe 24 through which passes a liquid and the fiber optic assembly 26. The flow rate of the liquid is different than the speed of the fiber optic assembly 26 through the pipe 24 such that drag is imparted on the fiber optic assembly 26 by the liquid, which imparts an EFL on the optical fiber 30 relative to the tube, in place of a clinching caterpuller 16. The EFL may be positive or negative. An entrance 32 and an exit 34 for the fiber optic assembly 26 are positioned on opposite ends of the pipe 24.

Further in and out ports 36 and 38, respectively, supply and receive liquid from the pipe 24.

According to an exemplary embodiment, the closed pipe 24 has a length of at least 2 meters (m) and a radius of 5 centimeters (cm) or less. In some embodiments, the length is at least one meter, at least a half meter, but may conceivably be less. In some embodiments, the length is at least three meters, at least five meters, and in some embodiments at least ten meters. In some embodiments, the radius is 25 centimeters or less, 10 centimeters or less, or wider than 25 centimeters. In some embodiments the radius 3 centimeters or less. The dimensions of the pipe 24 may be changed as a function of the speed of the liquid and the density/viscosity of the liquid, among other variable, to achieve a desired excess fiber length while not deforming the tube.

In some embodiments, the manufacturing line 10 includes a pump 40 in communication with liquid of the pipe 24. The pump 40 may draw or push liquid through the pipe 24. In some embodiments, more than one pump 40 is included. According to an exemplary embodiment, the liquid is water and the pump 40 has capacity to supply a volume stream of at least 0.04 cubic meters per second ($m^3/s$), such as at least 0.05 $m^3/s$, at least 0.07 $m^3/s$, and/or at least 0.1 $m^3/s$. In other embodiments, the pump 40 has a lesser capacity, such as at least 0.02 $m^3/s$, or less. A greater flow rate may compensate for a shorter pipe length or lower density of the liquid.

According to an exemplary embodiment, the liquid of the dynamic caterpuller 22 imparts sufficient drag on the tube 28 to form an excess fiber length of at least 0.05% on the one or more optical fibers 30 relative to the tube 28. In some embodiments, at least 0.01%, at least 0.1%, at least 0.2%, at least 0.5% of EFL is imparted.

According to an exemplary embodiment, a manufacturing process, as may be implemented on the above-described dynamic caterpuller system, includes a step of extruding a fiber optic assembly including a tube (e.g., sheath, jacket) containing at least one optical fiber. The method further includes passing the fiber optic assembly through a closed pipe of a dynamic caterpuller system (see FIG. 4), and passing a liquid through the closed pipe. The flow rate of the liquid is different than the speed of the fiber optic assembly through the pipe such that drag is imparted on the fiber optic assembly by the liquid.

In some embodiments, the method further includes controlling the flow rate and direction of liquid in the pipe to provide drag sufficient to impart an excess fiber length to the optical fiber relative to the tube. The flow rate and direction may be controlled via changing the pump speed and direction, tightening or releasing a restrictor valve, or other ways known in the art. In some embodiments, the liquid is water and the excess fiber length imparted is at least 0.05%. According to an exemplary embodiment, the method further includes steps of supplying a volume stream of water of at least 0.04 cubic meters per second ($m^3/s$) though the water pipe and/or passing water through the water pipe with an average velocity of the water of at least 20 meters per second (m/s). The process may also include a step of receiving the fiber optic assembly on a capstan located on a side of the dynamic caterpuller opposite to that of an extruder, as shown in FIG. 4.

Figure 5:
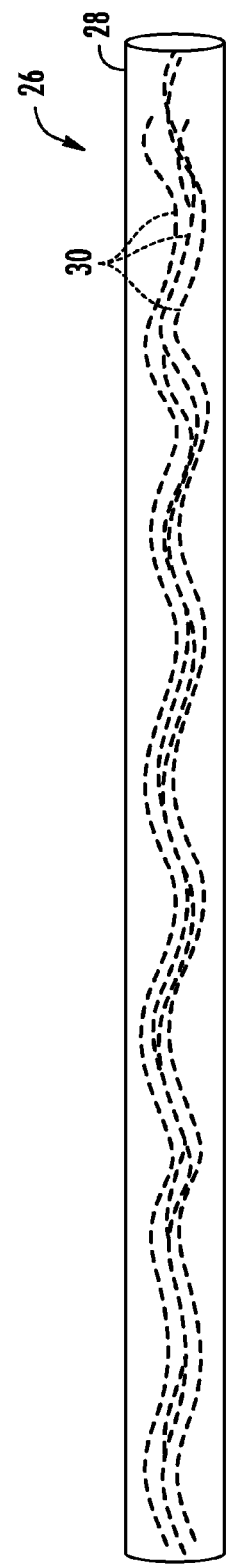
FIG. 5 is a schematic diagram of a buffer tube loosely containing a plurality of optical fibers according to an exemplary embodiment.

Benefits of the above-described manufacturing line and process may include the ability to manufacture unique fiber optic assemblies, such as particularly small and well-shaped buffer tubes that may be too narrow to be manufactured without being crushed by a conventional clinching caterpuller, for example. As shown in FIG. 5, such a fiber optic assembly 26 may include a plurality of optical fibers 30 and a buffer tube 28 surrounding the plurality of optical fibers 30.

The buffer tube 28 may be formed from a polymeric extrudate. According to an exemplary embodiment, the buffer tube 28 is narrow but not directly attached to the plurality of optical fibers 30. Instead, the plurality of optical fibers 30 are loosely contained by the buffer tube 28 such that the plurality of optical fibers 30 have an excess fiber length (EFL) relative to the length of the buffer tube 28.

In some such embodiments, the buffer tube 28 is particularly narrow, such as having an outer diameter of less than 2 millimeters (mm) with a wall thickness of at least 0.25 mm. In some embodiments, the diameter is less than 1.5 mm, less than 1.25 mm, and may even be less than 1 mm for a tube 28 containing particularly narrow optical fibers 30 or only one larger fiber 30. In some embodiments, diameter of the tube 28 is greater than 2 mm, such as less than 2.5 mm or greater than 2.5 mm. In some contemplated embodiments, the tube 28 is not round and the above distances may correspond to the average cross-sectional geometry (e.g., average of major and minor axes for a rectangular tube).

According to an exemplary embodiment, the buffer tube 28 is particularly round in cross-section, having an average ovality (i.e. twice the difference between longest and shortest cross-sectional widths divided by the sum of the longest and shortest cross-sectional widths) of 10% or less along a 10 meter length of the buffer tube, which may not be possible and/or feasible to manufacture for small-diameter buffer tubes using conventional processes and manufacturing lines. However, lower ovality allows for finer tolerances between stranded buffer tubes, thereby allowing for narrower loose tube cables. Further, lower ovality may reduce macro bending of optical fibers carried by the tubes, thereby reducing attenuation. In addition, lower ovality increases the volume of the tube for the same amount of material, thereby allowing for a lesser amount of material to achieve the same minimum cross-sectional area for the optical fibers when compared to tubes lacking the same precision. In some embodiments, the average ovality is 5% or less, such as 1% or less.

Ovality can be measured by using a micrometer (instrument fidelity of at least 10 microns) to measure cross-sections of a tube 28 at 10 equally spaced apart locations along a 180-degree arc of the tube 28 every decimeter for 10 meters, and then averaging the sum of the largest cross-sections and smallest cross-sections for every decimeter, and using those averaged values to calculate ovality. Alternatively, an ovality gauge may be used, with measurements taken every decimeter for ten meters and averaged.

According to an exemplary embodiment, the plurality of optical fibers 30 contained in the buffer tube 28 includes at least four optical fibers 30, each having a diameter of at least 200 micrometers (μm), such as about 250 μm. Use of four optical fibers 30 in a particularly small buffer tube 28 may be beneficial for routing signals in parallel optics communications, where the signals are broken down into four parts and transmitted simultaneously (or nearly so). Use of a particularly narrow buffer tube 28 to contain the optical fibers 30 for such a system may help to control relative fiber lengths, thereby reducing skew (e.g., less than 200 psec/km skew).

According to an exemplary embodiment, the fiber optic assembly 26 includes at least 0.05% EFL of the optical fibers (on average) to the length of the buffer tube, which can be measure by cutting a ten meter section of buffer tube, extracting the components, measure each individually, and comparing the lengths. In some embodiments, the EFL is at least 0.2%. The polymeric extrudate of the tube is, or at least includes, at least one of polypropylene, polybutylene terephthalate, polycarbonate, and polyvinyl chloride. For example, in some markets, polypropylene may be preferred, while in others polybutylene terephthalate may be preferred depending upon trade-offs between strength, flexibility, burn properties, and other parameters.

EXAMPLE

The following prophetic example, equations, and estimates are intended to provide general context for the present disclosure only, not an exact summary of an actual system. More specifically, the following may be used to estimate conditions needed to load buffer tubes with forces similar to those applied by traditional clinching caterpullers. In a first approximation, the resistance force due to friction caused by the water flow flowing around the buffer tube is given by the drag equation:

$$F_r = c_r \left(\frac{\rho v_0^2}{2}\right) A_0, \qquad (1)$$

where
$F_r$=drag on the buffer tube surface when water flows around the surface;
$c_r$=drag coefficient of the extruded object;
$v_0$=velocity of the water (relative to the buffer tube);
$A_0$=surface area of the buffer tube; and
$\rho$=mass density of water.

For a laminar flow, $c_r$ is estimated to be given by:

$$c_r = \frac{1.327}{\sqrt{Re}}, \qquad (2)$$

where
Reynolds number (Re) is estimated to be given by, $$Re = \frac{v_0 l}{v_{dyn}\rho}, \qquad (3)$$

where
dynamic viscosity ($v_{dyn}$) is in units of Pascal seconds; and
l=length of section of the tube acted upon.

From experiments performed by Applicant on a typical buffering line equipped with a clinching caterpuller, forces on the extruded element where between 1 to 7 N. Utilizing the above equations provides the following estimate for the water velocity to achieve a similar force:

$$F_r = 1.327\left(\frac{\pi}{2}\right) v_0 D_{tube} \sqrt{\rho v_0 l v_{dyn}}, \qquad (4)$$

where
buffer tube diameter=$D_{tube}$=0.003 m;
dynamic viscosity of water at 20° C.=$v_{dyn}$=0.0010087 Pa·s;
density of water=$\rho$=1000 kg/m$^3$; and
length of the section of the tube acted upon=l=3 m,
which results in a velocity ($v_0$) of about 20.5 m/s for 1 N of drag and 74 m/s for 7 N.

The amount of water to achieve the above flows is estimated (assuming laminar, incompressible flow), via:

$$\left(\frac{V}{t}\right) = \left(\frac{\pi(\Delta p)}{8v_{dyn}l}\right)R^4, \quad (5)$$

where $\frac{V}{t}$ = volume stream (in units of m³/s);

Δp=pressure difference between "input" and "output";
R=radius of the water tube; and
l=length of the water tube (same as the length of the buffer tube being acted upon). Assuming l to be 3 m and R to be 0.025 m, and using the velocities estimated above, the following volume streams and pressure changes are estimated: for $F_r$=1N, $v_0$=20.5 m/s, and Δp=800 N/m2, the volume stream is 0.041 m³/s; and
for $F_r$=7N, $v_0$=74 m/s, and Δp=2900 N/m2, the volume stream is 0.147 m³/s. As such the stream of water is between about 40 liters per second and 150 liters per second, which can be generated by conventional pumping equipment.

Referring again to FIG. 4 in view of the present Example, the dynamic caterpuller 22 may include a pipe 24 (e.g., PVC pipe, metal pipe, cement pipe) that is placed between an extruder 14 and a wheel capstan 18. In embodiments where the pipe 24 is round in cross-section, the diameter of the pipe 24 is shown as (2R) and the length of the pipe 24 is shown as (l). An extruded element, such as a buffer tube 28, tight-buffered fiber, or jacketed drop cable, is guided through the water pipe 24 by way of an entrance hole 32 and an exit hole 34. Splash guards or other components may control water exiting the holes.

Water flows through the pipe 24, and may be pumped therethrough via one or more pumps 40 coupled to either or both ends of the pipe 24. By selecting an appropriate pressure, a flow rate can be generated that results in a drag force on the buffer tube that can be varied, such as within the range of positive or negative 1 to 7 N, as discussed above. By changing the flow direction, the dynamic caterpuller 22 may apply either tension or compression to the extruded element, thereby applying a positive or negative EFL without crushing or otherwise deforming the buffer tubes.

Furthermore, it is contemplated that due to increased heat transfer via the flowing water, the length of the line may be decreased relative to lines employing only a water trough for cooling.

The construction and arrangements of the dynamic caterpuller systems and methods, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, the term "include," and its variations, such as "including," as used herein, in the alternative, means "comprising," "primarily consisting of" "consisting essentially of" and/or "consisting of," where possible in the particular usage herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present innovations and inventions.

What is claimed is:

1. A line for manufacturing a fiber optic assembly having a tube containing at least one optical fiber, the line comprising:
    an extruder;
    a dynamic caterpuller system comprising a closed pipe, the dynamic caterpuller system located after the extruder along the manufacturing line;
    a pump in fluid communication with the closed pipe; and
    a liquid having a predetermined flow rate through the closed pipe imparted to the liquid by the pump, wherein, during manufacturing of the fiber optic assembly, the tube is extruded via the extruder and passes into the dynamic caterpuller system and the flow rate imparted to the liquid by the pump is different than a speed of the fiber optic assembly passing through the closed pipe such that a drag is imparted on the tube sufficient to form an excess fiber length of at least 0.05% on the at least one optical fiber relative to the tube.

2. The manufacturing line of claim 1, wherein the closed pipe has a length of at least 2 meters (m) and a radius of 5 centimeters (cm) or less.

3. The manufacturing line of claim 1, wherein the liquid is water and the pump has capacity to supply a volume stream of at least 0.04 cubic meters per second (m³/s).

4. The manufacturing line of claim 1, further comprising a capstan, wherein the dynamic caterpuller is located between the extruder and the capstan along the manufacturing line.

* * * * *